HIGH SPEED CIRCUIT INTERRUPTION DETECTOR

Filed Aug. 21, 1962

INVENTOR.
MELVIN SCHWARTZ
RICHARD JOHN PATCH
BY
Arthur W. Collins
ATTORNEY

United States Patent Office 3,215,996

Patented Nov. 2, 1965

3,215,996

HIGH SPEED CIRCUIT INTERRUPTION DETECTOR

Melvin Schwartz and Richard J. Patch, Pittsfield, Mass., assignors, by mesne assignments, to the United States of America as represented by the Secretary of the Navy Filed Aug. 21, 1962, Ser. No. 218,470
4 Claims. (Cl. 340—253)

The present invention relates to novel and improved electrical test equipment and more particularly to novel and improved circuitry for detecting undesired momentary or instantaneous openings or closures of electrical switch contacts.

Various types of electronic and computer apparatus are often subjected to repeated sizable shocks and vibrations. Contacts of switches in such apparatus must particularly be capable of withstanding such vibratory conditions. Although suitable apparatus is available to test and detect switch contact interruptions in the millisecond range, considerable difficulty has been experienced heretofore in providing a reliable detector which records such interruptions in the microsecond range.

It is, therefore, a principal object of the present invention to provide novel and improved switch contact interruption apparatus which reliably detects interruptions in the microsecond range.

It is a further object of the present invention to provide a novel and improved microsecond switch contact interruption detector which utilizes the bistable characteristic of a tunnel diode to sense the instantaneous switch contact interruption.

Figure 1:
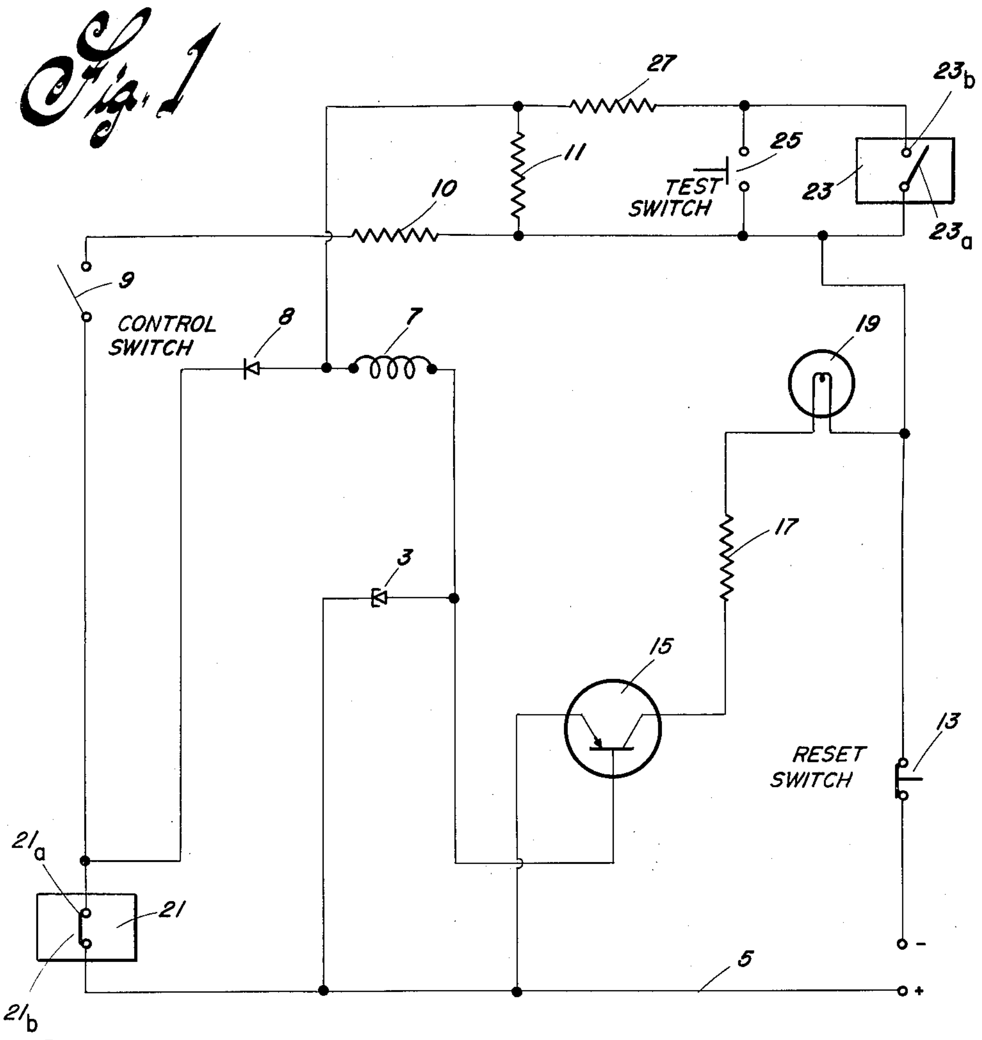
Figure 2:
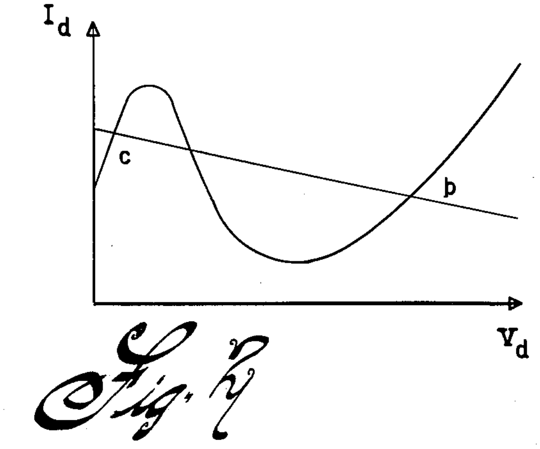

Other objects and many of the attendant advantages of this invention will be readily appreciated as the same becomes better understood by reference to the following detailed description when considered in connection with the accompanying drawing wherein:

FIG. 1 is a schematic diagram of a preferred embodiment of the present invention; and FIG. 2 is a plot of the voltage current curve of the bistable tunnel diode used in FIG. 1 of the drawing.

A preferred embodiment of the invention is illustrated in FIG. 1 of the drawing. As shown therein, the tunnel diode 3 is energized by a circuit that extends from the positive potential power supply line 5 through the tunnel diode and through the series connected inductor 7, resistor 11, and switch 13 to ground. A supplemental energizing circuit for tunnel diode 3 extends from the power supply line through diode 3, through inductor 7, diode element 8, switch 9, resistor 10 and switch 13 to ground. The junction of the tunnel diode 3 and the inductor 7 is connected to the base of the transistor 15. The emitter-collector circuit of the transistor 15 extends from the power supply line through the transistor, through resistor 17, through the lamp or other suitable indicator 19, and through switch 13 to ground. The device 21, including the normally closed contacts 21*a* and 21*b* which are to be monitored or tested for instantaneous openings, is connected between the power supply line 5 and the junction of the diode element 8 and the switch 9. The device 23 which includes normally open contacts 23*a* and 23*b* and which is to be monitored or tested for instantaneous shorts is connected in parallel with switch 25. Contact 23*a* of device 23 is connected to the junction of resistor 10 and switch 13. Contact 23*b* of device 23 is connected to the junction of diode element 8 and inductor 7 through resistor 27.

In operation, when the device 21 with its normally closed contacts 21*a* and 21*b* is to be monitored and device 23 is disconnected from the test circuit, switch 9 is first closed. Under these conditions the full potential of power supply line 5 is normally applied to the junction of diode 8 and switch 9 through device 21. No current therefore flows through diode 8 and the only circuit which conducts current through the tunnel diode 3 extends from the power supply line 5 through the tunnel diode through inductor 7 and resistor 11 and through reset switch 13 to ground. When the tunnel diode 3 carries this relatively low current load, it occupies its low voltage state shown at *b* in FIG. 2 of the drawing and the base of transistor 15 allows a minimal amount of current flow between the emitter and collector of the transistor 15 and through the indicator lamp 19. When the normally closed contacts of device 21 instantaneously open however, the full potential of power supply line 5 is removed from the junction of diode 8 and switch 9. An additional current path through the tunnel diode 3 is then established through diode 8, switch 9, and the relatively low resistance element 10. The increased flow of current through tunnel diode 3 then causes tunnel diode 3 to switch to its high voltage state shown in FIG. 2 of the drawing at *c* and the base of transistor 15 assumes a forward bias. With the increased current flow through transistor 15, indicator lamp 19 is then energized indicating the momentary or instantaneous open condition of contacts 21*a* and 21*b*. Inductor 7 controls the rate of increase of current through the tunnel diode 3 without blocking energization of transistor 15 or indicator lamp 19 when contacts 21*a* and 21*b* remain open for a predetermined microsecond interval. Reset switch 13 is provided to return the circuit to its above described normal operating condition and to repeat the test.

When the device 23 with its normally open contacts 23*a* and 23*b* is to be monitored or tested, device 21 is disconnected from the test circuit and switch 9 is opened. Under these conditions, tunnel diode 3 occupies its low voltage state as current flows from the power supply line 5 through the tunnel diode 3, the inductor 7, the relatively high resistance resistor 11 and reset switch 13 to ground. When the normally open contacts of device 23 momentarily or instantaneously close, an additional current path is established through the tunnel diode 3, inductor 7, the relatively low resistance resistor 27, contacts 23*a* and 23*b*, and reset switch 13 to ground. This increased flow of current through tunnel diode 3 then causes it to switch to its high voltage state and the base of transistor 15 assumes a forward bias. With the resultant increased flow of current through transistor 15, indicator lamp 19 is energized indicating the momentary or instantaneous closure of contacts 23*a* and 23*b*. Tunnel diode 3 may then be returned to its low voltage state for retest of stuck or permanently closed contacts in device 23.

Obviously many modifications and variations of the present invention are possible in the light of the above teachings. It is therefore to be understood that within the scope of the appended claims the invention may be practiced otherwise than as specifically described.

What is claimed is:

1. Apparatus for detecting instantaneous interruptions of a normally closed contact, said apparatus comprising:

(a) a tunnel diode;

(b) a relatively high resistance resistor;

(c) an energizing circuit for the tunnel diode, said circuit including the tunnel diode and the relatively high resistance resistor coupled in series;

(d) a conventional diode;

(e) a relatively low resistance resistor;

(f) a shunt circuit connected in parallel with the relatively high resistance resistor, said shunt circuit including the conventional diode and the relatively low resistance resistor in series;

(g) means for applying a potential to the junction of the conventional diode and the relatively low resistance resistor through the normally closed contact such that the conventional diode is normally cut off and such that when the normally closed contact opens the potential which normally cuts off the diode is removed and the flow of current through the tunnel diode is increased;

(h) and means for indicating a change to the increased state of energization of the tunnel diode.

2. Apparatus for detecting instantaneous interruptions of a normally closed contact, said apparatus comprising:

(a) a tunnel diode;
(b) a relatively high resistance resistor;
(c) a reset switch;
(d) an energizing circuit for the tunnel diode, said circuit including the tunnel diode, the relatively high resistance resistor and the reset switch in series;
(e) a conventional diode;
(f) a relatively low resistance resistor;
(g) a shunt circuit connected in parallel with the relatively high resistance resistor, said shunt circuit including the conventional diode and the relatively low resistance resistor in series;
(h) means for applying a potential to the junction of the conventional diode and the relatively low resistance resistor through the normally closed contact such that the conventional diode is normally cut off and such that when the normally closed contact opens the potential which normally cuts off the diode is removed and the flow of current through the tunnel diode, is increased;
(i) and means for indicating a change to the increased state of energization of the tunnel diode.

3. Apparatus for detecting instantaneous interruptions of a normally closed contact, said apparatus comprising:

(a) a tunnel diode;
(b) a relatively high resistance resistor;
(c) an inductor;
(d) an energizing circuit for the tunnel diode, said circuit including the tunnel diode, the inductor and the relatively high resistance resistor in series;
(e) a conventional diode;
(f) a relatively low resistance resistor;
(g) a shunt circuit connected in parallel with the relatively high resistance resistor, said shunt circuit including the conventional diode and the relatively low resistance resistor in series;
(h) means for applying a potential to the junction of the conventional diode and the relatively low resistance resistor through the normally closed contact such that the conventional diode is normally cut off and such that when the normally closed contact opens, the potential which normally cuts off the diode is removed and the flow of current through the tunnel diode, the inductor and the shunt circuit is increased;
(i) a transistor;
(j) means for coupling the base of the transistor to the junction of the tunnel diode and the inductor;
(k) a signaling device to indicate a change in the state of energization of the tunnel diode;

(l) and means for coupling the signaling device to the emitter-collector circuit of the transistor.

4. Apparatus for detecting instantaneous interruptions of a normally closed contact, said apparatus comprising:

(a) a tunnel diode;
(b) a relatively high resistance resistor;
(c) a reset switch;
(d) an inductor;
(e) an energizing circuit for the tunnel diode, said circuit including the tunnel diode, the inductor, the relatively high resistance resistor and the reset switch in series;
(f) a conventional diode;
(g) a relatively low resistance resistor;
(h) a shunt circuit connected in parallel with the relatively high resistance resistor, said shunt circuit including the conventional diode and the relatively low resistance resistor in series;
(i) means for applying a potential to the junction of the conventional diode and the relatively low resistance resistor through the normally closed contact such that the conventional diode is normally cut off and such that when the normally closed contact opens, the potential which normally cuts off the diode is removed and the flow of current through the tunnel diode, the inductor and the shunt circuit is increased;
(j) a transistor;
(k) means for coupling the base of the transistor to the junction of the tunnel diode and the inductor;
(l) a signaling device to indicate a change in the state of energization of the tunnel diode;
(m) and means for coupling the signaling device to the emitter-collector circuit of the transistor.

References Cited by the Examiner

UNITED STATES PATENTS

| | | | |
|---|---|---|---|
| 3,050,637 | 8/62 | Kaufman | 307—88.5 |
| 3,067,411 | 12/62 | Dhimos | 340—253 X |
| 3,103,597 | 9/63 | Novick et al. | 307—88.5 |
| 3,124,706 | 3/64 | Alexander | 307—88.5 |

OTHER REFERENCES

IBM Tech. Discl. Bul., TCA Inverter, by Gruodis et al., vol. 4, No. 2, July 1961, page 57.

IBM Tech. Discl. Bul., Light Sensor, by Masetti, vol. 4, No. 12, May 1962, page 71.

IBM Tech. Discl. Bul. Transistor Tunnel Diode Bistable Trigger, by Buelow et al., vol. 4, No. 12, May 1962, pages 78, 79.

G.E. Tunnel Diode Manual, Fig. 5.1, pages 43 and 44, Figs. 5, 12, pages 52 and 53, March 1961.

IBM Tech. Discl. Bul., "Esaki Diode Exclusive OR Circuit," by Groudis et al., vol. 4, No. 1, June 1961, pages 42–43.

IBM Tech. Discl., "Tunnel Diode Switching Time Comparator," by Lieber et al., vol. 4, No. 3, August 1961, pages 69–70.

NEIL C. READ, *Primary Examiner*.